United States Patent [19]

Umemoto et al.

[11] Patent Number: 4,535,128

[45] Date of Patent: Aug. 13, 1985

[54] POLYCARBOXYLIC-ALKYLENEIMINE RESINOUS COMPOSITION AND COATING COMPOSITION CONTAINING SAME

[76] Inventors: Hirotoshi Umemoto, 138-97, Oneo Hirono-cho, Uji-shi, Kyoto-fu; Hisaki Tanabe, B-40-508, Ishishiro 1 Otokogomo Yawata-shi, Kyoto-fu; Shinji Nakano, 95-401, Tonda-danchi 1319, Makita-cho, Osaka-fu, Takatsuki-shi, all of Japan

[21] Appl. No.: 567,314

[22] Filed: Dec. 30, 1983

[30] Foreign Application Priority Data

Aug. 4, 1983 [JP] Japan ................................ 58-142885

[51] Int. Cl.³ ............................................. C08L 61/28
[52] U.S. Cl. .................................. 525/162; 525/328.8; 525/375; 525/420; 525/427; 525/443; 525/448; 525/453; 525/456; 525/465; 525/467; 525/477; 525/510; 525/523
[58] Field of Search ...................... 525/162, 328.8, 443, 525/448, 453, 467, 510, 375, 420, 427, 456, 465, 477, 523

[56] References Cited

U.S. PATENT DOCUMENTS

| | | | |
|---|---|---|---|
| 3,290,417 | 12/1966 | Christenson et al. | 525/162 |
| 4,018,849 | 4/1977 | Chang et al. | 525/453 |
| 4,151,305 | 4/1979 | Davis et al. | 525/510 |

*Primary Examiner*—Theodore E. Pertilla
*Attorney, Agent, or Firm*—Wenderoth, Lin & Ponack

[57] ABSTRACT

A resinous composition for coating use comprising a resin obtained by the reaction of base resin having as essential groups, both carboxyl groups derived from a polycarboxylic acid whose titration midpoint potential in non-aqueous potentiometric titration is more than $-300$ mV in a state capable of developing a resinous acid value and a functional group reactive with a crosslinking agent, and an alkyleneimine compound in an amount equivalent to resinous acid value of 0.01 to 50, the resinous acid value based on said polycarboxylic acid in the final composition being 2 to 50.

This is useful for the preparation of a coating composition having improved curing property, storage stability and time color stability.

6 Claims, No Drawings

POLYCARBOXYLIC-ALKYLENEIMINE RESINOUS COMPOSITION AND COATING COMPOSITION CONTAINING SAME

FIELD OF INVENTION

The present invention relates to a coating composition comprising a novel resin and being excellent in low temperature curing property, storage stability and time color stability.

BACKGROUND OF THE INVENTION

Since an aminoplast obtained by the reaction of a compound having amino group, acid amide bonding or the like, and formaldehyde, as, for example, melamine resin, urea resin, aniline-formaldehyde resin and the like, has an active group such as active hydrogen, active methylol and active alkoxymethylene, it is generally combined with various resins for coating use having a functional group which is reactive with the abovesaid active group, such as hydroxyl groups, isocyanate groups or the like, including acrylic resin, alkyd resin, polyester resin, epoxy resin, polyurethane resin, polyamide resin, polycarbonate resin and the like, and used as heat curing type coating compositions.

Various isocyanate compounds are also used, having combined with said base resins, in heat curing type coating compositions. However, such coating compositions generally require high temperature baking, and when dealing with the combination of said resins and aminoplasts, baking is performed at about 140° C. for the combination of alkyd resin and melamine resin for automotive use and the baking is performed at about 170° C. and more for the combination of epoxy resin and amino resin for coil coating use.

From the standpoint of energy saving, it is, of course, desired to have a lower baking temperature and to this end, various proposals have been made. One of the proposals heretofore made is to increase the acid value and hydroxyl number of resin such as alkyd resins, thereby improving their reactivity with aminoplasts, and to increase the molecular weight of the resin, thereby improving the curing property thereof. However, this inevitably is accompanied by such problems as undesired increase in paint viscosity, lowering of storage stability and decrease in water resistance of the formed film. Attempts have also been made to increase the molecular weight of the aminoplast and improve the curing property of the coating composition but the results have been poor because of the additional problem of poor compatibility with alkyd and other resins.

There is another proposal which involves adding an external catalyst as p-toluene sulfonic acid, phosphoric acid and the like to the combination of coating use resin and crosslinking agent. However, no satisfactory results are obtained because of poor pigment dispersion stability, e.g. segregation, due to the presence of the external acid catalyst, poor storage stability due to the gradual curing of the coating composition at room temperature and the lowering of water resistance of the film.

According to Japanese Patent Application No. 232900/72 filed by the same applicant, the low temperature curing property has been markedly improved by the combination of crosslinking agent and a resin having a resinous acid value based on polycarboxylic acid whose titration midpouint potential in non-aqueous potentiometric titration, in a state capable of developing a resinous acid value, is more than −300 mV, of 2 to 50.

However, there is room for improvement in storage stability and even if alcohol, triethylamine or the like is added to strive for some improvement in that respect, there still remains the unsolved question of time color stability of the composition.

From the foregoing, the inventors, having endeavored to obtain a coating composition which comprises a coating resin and crosslinking agent, has an improved curing property without the necessity of using an external catalyst, is curable at a lower temperature or in a shorter period of time, and is excellent in storage stability as well as time color stability, capable of resulting excellent film performance, have completed the invention.

SUMMARY OF THE INVENTION

According to the present invention, there is provided a resinous composition for coating use, having an acid value based on carboxyl groups of polycarboxylic acid whose titration midpoint potential in non-aqueous potentiometric titration is more than −300 mV in a state capable of developing resinous acid value of 2 to 50, obtained by the reaction of (A) the basic resin having as essential functional groups, both carboxyl groups derived from polycarboxylic acid whose titration midpoint potential in non-aqueous potentiometric titration is more than −300 mV in a state capable of developing resinous acid value, and the groups reactive with a crosslinking agent, with (B) an alkyleneimine compound having at least one alkyleneimine ring of 2 to 3 carbon atoms, in an amount equivalent to a resinous acid value of 0.01 to 50.

The invention also provides a coating composition being excellent in storage stability, time color stability and low temperature curing properties, comprising (C) a resinous composition having a resinous acid value based on carboxyl groups of polycarboxylic acid whose titration midpoint potential in non-aqueous potentiometric titration is more than −300 mV in a state capable of developing a resinous acid value of 2 to 50, obtained by the reaction of (A) a basic resin having as essential functional groups both carboxyl groups derived from polycarboxylic acid whose titration midpoint potential in non-aqueous potentiometric titration is more than −300 mV in a state capable of developing a resinous acid value and the groups reactive with a crosslinking agent, and (B) an alkyleneimine compound having at least one alkyleneimine ring of 2 to 3 carbon atoms, in an amount equivalent to a resinous acid value of 0.01 to 50, and (D) crosslinking agent, the solid weight ratio of (C) to (D) being 95-45 to 5-55.

The alkyleneimine compounds as used in the present invention and having at least one alkyleneimine ring of 2 to 3 carbon atoms may include the group of compounds represented by the following generic formula:

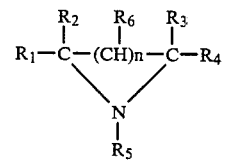

wherein $R_1, R_2, R_3, R_4$ and $R_5$ each represents hydrogen; an alkyl group having 1 to 20 carbon atoms as methyl, ethyl, propyl and the like; aryl such as phenyl and the like; alkaryl such as tolyl, xylyl and the like; and aralkyl such as benzyl, phenethyl and the like; $R_6$ is hydrogen or alkyl having 1 to 6 carbon atoms; n is 0 or 1.

The abovementioned groups may further include substituents having no adverse effects on the fundamental properties of the imine in the intended reaction. Examples of such substituents are carbonyl, cyano, halogen, amino, hydroxyl, alkoxy, carbalkoxy and nitrile. Thus, the abovementioned groups may be, for example, cyanoalkyl, haloalkyl, aminoalkyl, carbalkoxyalkyl and the corresponding aryl, alkaryl and aralkyl groups.

Some of the compounds having 2 and more of such groups may not easily be prepared due to the steric effect or interaction of these groups. Therefore, in many cases, $R_1$-$R_6$ are mostly composed of hydrogen.

Typical examples of alkyleneimine compounds are as follows: ethyleneimine, 1,2-propyleneimine, 1,3-propyleneimine, 1,2-dodecyleneimine, 1,1-dimethylethyleneimine, phenylethyleneimine, tolylethyleneimine, benzylethyleneimine, 1,2-diphenylethyleneimine, 2-hydroxyethylethyleneimine, aminoethylethyleneimine, 2-methylpropyleneimine, 3-chloropropylethyleneimine, p-chlorophenylethyleneimine, methoxyethylethyleneimine, carboethoxyethylethylene imine, N-ethylethyleneimine, N-butylethyleimine, N-(2-aminoethyl)ethylene imine, N-(2-hydroxyethyl)ethyleneimine, N-(cyanoethyl)ethyleneimine, N-phenyl ethyleneimine, N-triethylethyleneimine, N-(p-chlorophenyl)ethyleneimine, N-(2-carbethoxy-1-ethyl)ethyleneimine.

Particularly useful members from the standpoint of availability and effectiveness are ethyleneimine, 1,2-propyleneimine and N-(2-hydroxyethyl)ethyleneimine. Besides the abovesaid preferable members, other alkyleneimine compounds than those of said generic formula may be satisfactorily used. For example, good results are obtained with alkyleneimines having 2 and more of the alkyleneimine rings such as ethylene-1,2-bisaziridine, 1,2,4-tris(2,1-aziridinylethyl)-trimellitate and the like. Therefore, in the present invention, the term "alkylene imine compounds" may include substituted alkyleneimines and all of the above-mentioned alkyleneimine compounds.

The intended reaction may be carried out by mixing the said alkyleneimine compound and the basic resin having both carboxyl groups based on polycarboxylic acid whose titration midpoint potential in non-aqueous potentiometric titration is more than $-300$ mV in a state capable of developing a resinous acid value and the functional group reactive with the crosslinking agent, and heating the mixture at an elevated temperature, e.g. 20° to 150° C.

The alkyleneimine compound is used in an amount equivalent to the resinous acid value of 0.01 to 50 and finally there is prepared the resin having a resinous acid value based on the polycarboxylic acid whose titration midpoint potential in non-aqueous potentiometric titration is more than $-300$ mV in a state capable of developing resinous acid value, of 2 to 50.

The basic resin per se originally has, as well as the functional group reactive with crosslinking agent, a number of carboxyl groups capable of developing resinous acid value, at least part of which are occupied by those of special strong acids useful for low temperature curing, i.e. polycarboxylic acid whose titration midpoint potential in non-aqueous potentiometric titration is more than $-300$ mV in a state capable of developing a resinous acid value. The inventors have surprisingly found that when the abovesaid type of alkylene imine compound is reacted with said basic resin so as to lower the resinous acid value to the extent of 0.01 to 50, but still maintaining in the final resin a resinous acid value coming from the carboxyl groups of polycarboxylic acid whose titration midpoint potential in non-aqueous potentiometric titration is more than $-300$ mV of 2 to 50, and the thus obtained resin is used, together with a cross linking agent as aminoplast, for the preparation of coating composition, the so-called internal catalyst function is effectively produced at the time of baking, thereby resulting an improved low temperature curing, and the storage stability of the composition is greatly improved. Furthermore, very surprisingly, this coating composition has been proved to be possessed of excellent time color stability. On the basis of these findings, the invention has been made. When used the present coating composition, the resulted cured film is excellent in many respects and can be comparable with those of the heretofore known compositions. For example, in the combination of melamine resin as aminoplast and alkyd resin, the composition is usually baked and hardened, as practiced in the automobile industry, at 140° C. for about 30 minutes. However, by the adoption of present invention, it is possible to carry out the same extent of baking at 70° to 110° C. or even lower temperature, to obtain the similar product. No change in the film performance can be found.

In case that a melamine resin is used as an aminoplast, it should preferably be compatible with the present resin. In this regard, particular preference is given to the melamine resin having more than 2.0 alkoxy groups per triazine ring. There is no particular limit in the number average molecular weight and it may be in a conventional range of 500 to 3,000 or the like.

Even in the combination with hexamethoxymethylol melamine, it is possible to attain a lower temperature curing and to provide a high solid coating composition.

In the present invention, the abovesaid resin and crosslinking agent are used in a weight ratio (on solid basis) of 95/5 to 45/55.

Such composition may be used as clear coating as is or may be added with pigment and other additives and used as colored paint.

At the time when isocyanate compound is selected as a crosslinking agent and an external catalyst is added to a coating composition, troubles have been always encountered in the pot-life of the composition.

However, with the present resinous composition, it is possible to obtain, without the necessity of adding an external catalyst, a coating composition which is capable of resulting an excellent coating and shows an improved pot-life as well as time color stability. Thus, in the present invention, there is provided a resinous composition useful as resinous vehicle for a coating composition, which is characterized by excellent curing property, storage and time color stabilities and film performance, without the necessity of adding an external catalyst as in the conventional ones.

Therefore, the invention is quite important from the standpoint of saving natural resources.

This invention shall be now more fully explained in the following Examples. Unless otherwise stated, all parts are by weight.

EXAMPLE 1

Into a reaction vessel fitted with a heating device, stirrer, refluxing device, water separator, fractionator and thermometer, were placed 88.6 parts of coconut oil, 22.1 parts of dehydrated castor oil, 39.9 parts of trimethylolethane, and 0.1 part of lithium naphthenate and the mixture was heated to 240° C. Ester-exchange reaction was effected at 240° C., and then there were added 38.7 parts of trimethylolethane, 141.8 parts of isophthalic acid, 14.6 parts of adipic acid, 31.6 parts of neopentylglycol and 7 parts of xylene. The mixture was heated to 220°–230° C., the dehydration reaction was effected at the same temperature until the resinous acid value of 2.0 and then the mixture was allowed to cool. Next, 31 parts of xylene were added to adjust the non-volatile content to 90%, and after adding 10.0 parts of phthalic anhydride, the mixture was reacted at 150° C. for 1 hour. 125 Parts of xylene were added to adjust the non-volatile content to 68.2%, 1.66 parts of N-(2-hydroxyethyl)ethyleneimine(HEEI) were added, the mixture was reacted at 80° C. for 1 hour and finally 67 parts of Cellosolve acetate were added to obtain alkyd resin varnish A. The characteristics of this varnish are shown in Table 1.

EXAMPLES 2 TO 7

The same procedures as stated in Example 1 were repeated excepting using the materials shown in Table 1 under the columns of Examples 2 to 7 (In Examples 4 to 7, no ester exchange reaction step was involved). The characteristics of thus obtained varnishes B to G are shown in Table 1.

In these Examples, the alkyleneimines and basic resins used are as follows:

| Example | alkyleneimine | basic resin |
|---|---|---|
| 2 | ethyleneimine (EI) | alkyd resin |
| 3 | N—(2-hydroxyethyl)ethyleneimine (HEEI) | alkyd resin |
| 4 | N—(2-hydroxyethyl)ethyleneimine (HEEI) | polyester resin |
| 5 | 1,2-propyleneimine (PI) | polyester resin |
| 6 | N—(2-hydroxyethyl)ethyleneimine (HEEI) | polyester resin |
| 7 | N—(2-hydroxyethyl)ethyleneimine (HEEI) | polyester resin |

EXAMPLES 8 AND 12

(Comparative Example)

Preparation of acrylic resin varnish H and Comparative varnish L

Into a reaction vessel, were placed 80 parts of xylene, 20 parts of Cellosolve acetate, 35 parts of methyl methacrylate (MMA), 48 parts of ethyl acrylate (EA), 16 parts of 2-hydroxyethyl methacrylate (HEMA) and 1 part of methacrylic acid (MAA), and the mixture was heated to 110° C. While maintaining the same temperature, a mixed solution of 80 parts of xylene, 20 parts of Cellosolve acetate, 1 part of azobisisobutyronitrile and 0.25 part of laurylmercaptane was dropwisely added at a constant rate in 3 hours, and after standing for 2 hours, 3.7 parts of tetrachlorophthalic anhydride were added and the mixture was heated to 140° C. When the resinous acid value reached to 14.0, the mixture was allowed to cool. The characteristics of thus obtained acrylic resin varnish L (Comparative resin varnish) are shown in Table 1.

To the acrylic resin varnish L, were added 0.33 part of N-(2-hydroxyethyl)ethyleneimine and the mixture was reacted at 80° C. for 1 hour and then allowed to cool. The characteristics of the thus obtained acrylic resin varnish H are shown in Table 1.

EXAMPLE 9

(Comparative alkyd resin varnish I)

Alkyd resin varnish I was prepared in a conventional way, using the materials shown in Table 1. The characteristics of thus obtained varnish are also given in Table 1.

EXAMPLES 10-11

(Comparative polyester resin varnishes J and K)

The materials shown in Table 1 under the column of 1st step reaction (dehydration) were reacted until the resinous acid value of 2.0 and xylene was added to adjust the non-volatile content of 90.0%. Thereafter, phthalic anhydride in Example 10 and tetrachlorophthalic anhydride in Example 11 each was added and reacted at 150° C. for 1 hour. After cooling, xylene and cellosolve acetate (70/30) were added to obtain polyester resin varnishes J and K, respectively. The characteristics of these varnishes are shown in Table 1.

EXAMPLE 13

A coating composition was prepared by mixing 35.0 parts (solid) of alkyd resin varnish A obtained in Example 1, 15.0 parts (solid) of U-van 20 SE-60 (melamine resin, manufactured by Mitsui Toatsu K.K.), 8.0 parts of xylene, 4.0 parts of Solvesso 100, 7.0 parts of n-butanol, 0.015 part of Silicone KF-69 (Shinetsu Kagaku K.K.), 45.0 parts of Titanium CR-95 (Ishihara Sangyo K.K.) and 2.3 parts of Fastgen Blue-NK (Dainippon Ink K.K.). Thus obtained pale bluish white colored paint composition was diluted with a mixed solvent of 20.0 parts of Solvesso 100, 50.0 parts of toluene, 10.0 parts of xylene and 20.0 parts of n-butanol, to adjust the viscosity (Ford cup #4 viscosity) to 20 sec./25° C. This was applied by spraying onto SPC-1 dull steel plate previously treated with zinc phosphate and after keeping for a defined period of time, the coated plate was baked at 100° C. for 30 minutes. The coating was evaluated and the test results are shown in Table 2. The storage stability and time color stability of said pale bluish white colored coating composition were also evaluated and the test results are shown in Table 2.

EXAMPLES 14-22

In Example 13, alkyd resin varnish A was replaced by each of the following and coating composition was prepared according to the prescription of Table 2. The viscosity of the composition was adjusted, and it was applied on the similar dull steel plate and baked at 100° C. for 30 minutes as in Example 13. The coating was evaluated and results were shown in Table 2. Storage stability and time color stability of the composition were also evaluated and results were given in the same Table.

Example 14: alkyd resin B (Example 2)
Example 15: alkyd resin C (Example 3)
Example 16: polyester resin D (Example 4)
Example 17: polyester resin E (Example 5)
Example 18: polyester resin F (Example 6)
Example 19: polyester resin G (Example 7)
Example 20: polyester resin D (Example 4)
Example 21: polyester resin D (Example 4)
Example 22: acrylic resin H (Example 8)

COMPARATIVE EXAMPLES 1-5

In Example 13, the alkyd resin varnish A was replaced by each of the following resin varnish and the respective coating composition was prepared as in Example 13 (in Comparative Example 3, 1.0 part of p-toluenesulfonic acid was added as external catalyst). After adjusting the viscosity, the composition was applied on a similar dull steel plate and baked at 100° C. for 30 minutes. The coating properties were evaluated and shown in Table 2. Storage stability and time color stability of the coating composition were also evaluated and the results were shown in Table 2.

Comparative Example 1: alkyd resin I (Example 9)
Comparative Example 2: alkyd resin J (Example 10)
Comparative Example 3: alkyd resin I (Example 9)
Comparative Example 4: polyester resin K (Example 11)
Comparative Example 5: acrylic resin L (Example 12)

EXAMPLES 23-25

In Example 13, the melamine resin U-20 SE-60 was replaced by Cymel 303 (Mitsui Toatsu K.K.) and alkyd resinous varnish A was replaced by each of the following resinous varnishes to obtain the respective coating compositions. After adjusting the viscosity, each of the compositions were applied on similar dull steel plates and baked at 120° C. for 30 minutes. The coatings were evaluated the test results were shown in Table 2. Storage stability and time color stability of the coating composition were also evaluated and the test results were given in Table 2.

Example 23: alkyd resin C (Example 3)
Example 24: polyester resin D (Example 4)
Example 25: polyester resin G (Example 7)

COMPARATIVE EXAMPLES 6-8

In Example 13, melamine resin U-20SE-60 was replaced by Cymel 303 (Mitsui Toatsu K.K.) and alkyd resinous varnish A was by each of the following varnishes, to obtain the coating compositions (In Comparative Example 7, 1.0 part of p-toluene sulfonic acid was added as external catalyst). They were, after adjusting the viscosity, applied on similar dull steel plates and baked at 120° C. for 30 minutes. The thus obtained coatings were evaluated and the test results were shown in Table 2. The storage stability and time color stability of the coating composition were also evaluated and test results were given in Table 2.

Comparative Example 6: alkyd resin I (Example 9)
Comparative Example 7: alkyd resin I (Example 9)
Comparative Example 8: polyester resin K (Example 11)

EXAMPLE 26

The coating composition obtained in Example 25 was, after adjusting viscosity, applied on a similar dull steel plate as used in example 13 and baked at 100° C. for 30 minutes. The coating properties were evaluated and the results were shown in Table 2. Storage stability and time color stability of the coating composition were almost identical with those of Example 25.

EXAMPLE 27

The coating composition obtained in Example 19 was applied on the similar plate and baked at 80° C. for 30 minutes. The coating properties were evaluated and the results were shown in Table 2. It was found that storage stability and time color stability of the composition were identical with those of Example 19.

COMPARATIVE EXAMPLE 9

To the coating composition obtained in Comparative Example 4 was added 0.5 part of triethanolamine and coated and baked at 100° C. for 30 minutes. The properties of the coating and storage stability and time color stability of the coating composition were evaluated and the test results were given in Test methods and evaluation standards:

Note 2: Pencil hardness
  The coating was scratched by Mitsubishi Uni pencil and pencil hardness was judged by maximum hardness causing no pencil scratches.

Note 3: Gel fraction
  Sample specimen of baked coating was subjected to a solvent extraction, by using Soxhlet-extractor, with acetone/methanol=1/1 (weight ratio) at 70° C. for 5 hours. The specimen was then dried at 120° C. for 30 minutes in a dessicator, allowed to cool and the final weight was taken. From the weight difference, the gel fraction was calculated.

Note 4: Coat surface condition:
  The coating composition was applied on tinplate by flow coating, and pigment dispersion stability was evaluated by visual observation of finishing appearance, gloss and on the basis of the following criteria:
  o ... very good
  ... good
  Δ ... slightly inferior
  X ... no good Note 5: water resistance
  The baked sample specimen was dipped in warmed water (40° C.) for 10 days and the coat surface condition was evaluated on the basis of the following criteria:
  ... no abnormality
  Δ ... partly blistered
  X ... blistered, gloss down Note 6: Storage stability
  Coating composition was kept at 50° C. for 30 days and storage stability was evaluated by measuring the viscosity of the composition before and after said storage (measured by Stormer's viscometer), comparing the same and by following the undermentioned criteria:
  o storage stability is quite excellent and there are no problems in practical use
    storage stability is good and there are no problems in practical use
  Δ storage stability is slightly inferior and there are problems in practical use
  X storage stability is no good and it enjoy practical use Note 7 Time color stability
  The coating composition was kept standing at 20° C. for 2 weeks. Thereafter, the composition was stirred well by a stirring machine and applied by spraying, and then baked. Color difference (ΔE value) between the baked plate and the standard plate (the same composition was applied by spraying immediately after being prepared and baked) was determined and the time color stability was evaluated from the following criteria:

○ ... color difference (ΔE) is less than 0.1, and time color stability is very good
... color difference (ΔE) is less than 0.3 and time color stability is good
Δ ... color difference (ΔE) is less than 0.5 and time color stability is slightly inferior
X ... color difference (ΔE) is more than 0.5 and time color stability is no good

TABLE 1

| Example<br>name of varnish<br>basic resin | Example 1<br>A<br>alkyd resin | Example 2<br>B<br>alkyd resin | Example 3<br>C<br>alkyd resin | Example 4<br>D<br>PE resin | Example 5<br>E<br>PE resin | Example 6<br>F<br>PE resin |
|---|---|---|---|---|---|---|
| 1st stage reaction | | | | | | |
| isophthalic acid | 141.8 | 141.8 | 141.8 | 113.0 | 127.3 | 127.3 |
| adipic acid | 14.6 | 14.6 | 14.6 | 29.2 | 29.2 | 29.2 |
| trimethylolpropane | | | | 25.1 | 25.1 | 25.1 |
| trimethylolethane | 78.6 | 78.6 | 78.6 | | | |
| neopentylglycol | 31.6 | 31.6 | 31.6 | 52.8 | 52.8 | 52.8 |
| 1,6-hexanediol | | | | 56.0 | 56.0 | 56.0 |
| coconut oil | 88.6 | 88.6 | 88.6 | | | |
| dehydrated castor oil | 22.1 | 22.1 | 22.1 | | | |
| resinous acid value at the end of 1st react. | 2.0 | 2.0 | 2.0 | 2.0 | 2.0 | 2.0 |
| 2nd stage reaction | | | | | | |
| polcarboxylic acid(a) Note 1 | phthalic anhyd. | pyromellitic anhydride | tetrachloro phthalic anhyd. | phthalic anhyd. | trimellitic anhydride | tetrachloro phthalic anhyd. |
| amounts | 10.0 | 3.5 | 18.5 | 45.0 | 6.0 | 11.0 |
| Characteristics of resin | | | | | | |
| resin. acid value of basic resin | 13.0 | 9.0 | 12.0 | 60.0 | 12.0 | 10.0 |
| resin. acid value based on (a) acid Note 2 | 11.0 | 7.0 | 10.0 | 58.0 | 10.0 | 8.0 |
| titration midpoint potential of (a) | −290 | −180 | −120 | −290 | −230 | −120 |
| alkyleneimine compound | | | | | | |
| name | HEEI | EI | HEEI | HEEI | PI | HEEI |
| amounts | 1.66 | 0.05 | 1.68 | 10.3 | 0.93 | 0.82 |
| equivalent res. acid value | 3.0 | 0.2 | 3.0 | 23.0 | 4.0 | 2.0 |
| Varnish characteristics | | | | | | |
| non-volatile content % | 60.3 | 60.1 | 60.0 | 60.0 | 60.0 | 60.1 |
| varnish viscosity | U-V | X | V | Y-Z | W | V-W |
| total resin. acid value | 10.3 | 8.8 | 9.0 | 36.8 | 8.3 | 7.9 |
| resin. acid value based on (a) acid Note 2 | 8.6 | 6.8 | 7.2 | 35.0 | 6.5 | 6.1 |

| Example<br>name of varnish<br>basic resin | Example 7<br>G<br>PE resin | Example 8<br>H<br>acrylic resin | Example 9<br>I<br>alkyd resin | Example 10<br>J<br>alkyd resin | Example 11<br>K<br>PE resin | Example 12<br>L<br>acrylic resin |
|---|---|---|---|---|---|---|
| 1st stage reaction | | | | | | |
| isophthalic acid | 127.3 | MMA 35 | 149.6 | 141.8 | 127.3 | MMA 35 |
| adipic acid | 29.2 | EA 48 | 14.6 | 14.6 | 29.2 | EA 48 |
| trimethylolpropane | 25.1 | HEMA 16 | | | 25.1 | HEMA 16 |
| trimethylolethane | | MAA 1 | 78.6 | 78.6 | | MAA 1 |
| neopentylglycol | 52.8 | | 31.6 | 31.6 | 52.8 | |
| 1,6-hexanediol | 56.0 | | | | 56.0 | |
| coconut oil | | | 88.6 | 88.6 | | |
| dehydrated castor oil | | | 22.1 | 22.1 | | |
| resinous acid value at the end of 1st react. | 2.0 | 7.0 | 8.0 | 2.0 | 2.0 | 7.0 |
| 2nd stage reaction | | | | | | |
| polycarboxylic acid(a) Note 1 | tetrachloro phthalic anhyd | tetrachloro phthalic anhyd. | | phthalic anhyd. | tetrachloro phthalic anhyd. | tetrachloro phthalic anhyd. |
| amounts | 25.5 | 3.7 | | 10.0 | 18.4 | 3.7 |
| Characteristics of resin | | | | | | |
| resin. acid value of basic resin | 20.0 | 14.0 | | 13.0 | 15.0 | 14.0 |
| resin. acid value based on (a) acid Note 2 | 18.0 | 7.0 | | 11.0 | 13.0 | 7.0 |
| titration midpoint potential of (a) | −120 | −120 | | −290 | −120 | −120 |
| akyleneimine compound | | | | | | |
| name | HEEI | HEEI | | | | |
| amounts | 2.16 | 0.33 | | | | |
| equivalent res. acid value | 5.0 | 2.0 | | | | |
| Varnish characteristics | | | | | | |
| non-volatile content % | 59.8 | 51.3 | 60.0 | 60.0 | 60.1 | 51.1 |
| varnish viscosity | V | Z-Z₁ | U | U-V | X-YZ₁ | Z |
| total resin. acid value | 15.5 | 12.1 | 8.0 | 13.0 | 15.0 | 14.0 |
| resin. acid value based | 13.5 | 5.5 | | 11.0 | 13.0 | 7.0 |

TABLE 1-continued on (a) acid Note 2

Note 1: polycarboxylic acid whose titr. midpoint potent. is more than −300 mV
Note 2: measured by non-aqueous potentiometric titration method

TABLE 2

| Example Number | Example 13 | Example 14 | Example 15 | Comp. Exam. 1 | Comp. Exam. 2 | Comp. Exam. 3 | Example 16 |
|---|---|---|---|---|---|---|---|
| Formulation Note 1 | | | | | | | |
| alkyd resin | A 35.0 | B 35.0 | C 35.0 | I 35.0 | J 35.0 | I 35.0 | D 35.0 |
| polyester resin | — | — | — | — | — | — | — |
| acrylic resin | — | — | — | — | — | — | — |
| melamine resin U20SE | 15.0 | 15.0 | 15.0 | 15.0 | 15.0 | 15.0 | 15.0 |
| melamine resin C-303 | — | — | — | — | — | — | — |
| xylene | 8.0 | 8.0 | 8.0 | 8.0 | 8.0 | 8.0 | 8.0 |
| Solvesso 100 | 4.0 | 4.0 | 4.0 | 4.0 | 4.0 | 4.0 | 4.0 |
| n-butanol | 7.0 | 7.0 | 7.0 | 7.0 | 7.0 | 7.0 | 7.0 |
| Titanium CR-95 | 45.0 | 45.0 | 45.0 | 45.0 | 45.0 | 45.0 | 45.0 |
| Fastgen blue NK | 2.3 | 2.3 | 2.3 | 2.3 | 2.3 | 2.3 | 2.3 |
| Silicone KF-69 | 0.015 | 0.015 | 0.015 | 0.015 | 0.015 | 0.015 | 0.015 |
| triethylamine | — | — | — | — | — | — | — |
| ext. catalyst PTS | — | — | — | — | — | 1.0 | — |
| Baking condition °C. × 30′ | 100 | 100 | 100 | 100 | 100 | 100 | 100 |
| Film properties | | | | | | | |
| pencil hardness Note 2 | HB-F | F | H-2H | 3 B | HB-F | H-2H | H—2H |
| gel fraction Note 3 | 91 | 93 | 95 | 51 | 91 | 95 | 95 |
| surface cond. Note 4 | | | | | | X | |
| water resist. Note 5 | | | | X | | X | |
| Paint properties | | | | | | | |
| storage stab. Note 6 (50° C.) | | | | | X | X | |
| time color stability Note 7 | | | | Δ | X | X | |

| Example Number | Example 17 | Example 18 | Example 19 | Example 20 | Example 21 | Comp. Exam. 4 | Example 22 |
|---|---|---|---|---|---|---|---|
| Formulation Note 1 | | | | | | | |
| alkyd resin | E 35.0 | F 35.0 | G 35.0 | D 35.0 | D 35.0 | K 35.0 | H 35.0 |
| polyester resin | — | — | — | — | — | — | — |
| acrylic resin | — | — | — | — | — | — | — |
| melamine resin U20SE | 15.0 | 15.0 | 15.0 | 10.0 | 20.0 | 15.0 | 15.0 |
| melamine resin C-303 | — | — | — | — | — | — | — |
| xylene | 8.0 | 8.0 | 8.0 | 8.0 | 8.0 | 8.0 | 8.0 |
| Solvesso 100 | 4.0 | 4.0 | 4.0 | 4.0 | 4.0 | 4.0 | 4.0 |
| n-butanol | 7.0 | 7.0 | 7.0 | 7.0 | 7.0 | 7.0 | 7.0 |
| Titanium CR-95 | 45.0 | 45.0 | 45.0 | 45.0 | 45.0 | 45.0 | 45.0 |
| Fastgen blue NK | 2.3 | 2.3 | 2.3 | 2.3 | 2.3 | 2.3 | 2.3 |
| Silicone KF-69 | 0.015 | 0.015 | 0.015 | 0.015 | 0.015 | 0.015 | 0.015 |
| triethylamine | — | — | — | — | — | — | — |
| ext. catalyst PTS | — | — | — | — | — | — | — |
| Baking condition °C. × 30′ | 100 | 100 | 100 | 100 | 100 | 100 | 100 |
| Film properties | | | | | | | |
| pencil hardness Note 2 | H | H—2H | 2H | H | 2H | 2H | 2H |
| gel fraction Note 3 | 93 | 95 | 96 | 87 | 94 | 96 | 95 |
| surface cond. Note 4 | | | | | | Δ | |
| water resist. Note 5 | | | | | | | |
| Paint properties | | | | | | | |
| storage stab. Note 6 (50° C.) | | | | | | X | |
| time color stability Note 7 | | | | | | X | |

| Example Number | Comp. Exam. 5 | Example 23 | Example 24 | Example 25 | Comp. Exam. 6 | Comp. Exam. 7 | Comp. Exam. 8 |
|---|---|---|---|---|---|---|---|
| Formulation Note 1 | | | | | | | |
| alkyd resin | L 35.0 | C 35.0 | D 35.0 | G 35.0 | I 35.0 | I 35.0 | K 35.0 |
| polyester resin | — | — | — | — | — | — | — |
| acrylic resin | — | — | — | — | — | — | — |
| melamine resin U20SE | 15.0 | | | | | | |
| melamine resin C-303 | — | 15.0 | 15.0 | 15.0 | 15.0 | 15.0 | 15.0 |
| xylene | 8.0 | 8.0 | 8.0 | 8.0 | 8.0 | 8.0 | 8.0 |
| Solvesso 100 | 4.0 | 4.0 | 4.0 | 4.0 | 4.0 | 4.0 | 4.0 |
| n-butanol | 7.0 | 7.0 | 7.0 | 7.0 | 7.0 | 7.0 | 7.0 |
| Titanium CR-95 | 45.0 | 45.0 | 45.0 | 45.0 | 45.0 | 45.0 | 45.0 |
| Fastgen blue NK | 2.3 | 2.3 | 2.3 | 2.3 | 2.3 | 2.3 | 2.3 |
| Silicone KF-69 | 0.015 | 0.015 | 0.015 | 0.015 | 0.015 | 0.015 | 0.015 |
| triethylamine | — | — | — | — | — | — | — |
| ext. catalyst PTS | — | — | — | — | — | 1.0 | — |
| Baking condition °C. × 30′ | 100 | 120 | 120 | 120 | 120 | 120 | 120 |
| Film properties | | | | | | | |
| pencil hardness Note 2 | 2H | F-H | F-H | H-2H | 6 B | F-H | H-2H |
| gel fraction Note 3 | 95 | 91 | 91 | 95 | 25 | 90 | 95 |

TABLE 2-continued

|  |  |  |  |
|---|---|---|---|
| surface cond. Note 4 | X | X | Δ |
| water resist. Note 5 | X | X |  |
| Paint properties |  |  |  |
| storage stab. Note 6 (50° C.) | X | X | X |
| time color stability Note 7 | X (Δ) | X | X |

| Example Number | Example 26 | Example 27 | Comp. Exam. 9 |
|---|---|---|---|
| Formulation Note 1 |  |  |  |
| alkyd resin | G 35.0 | G 35.0 | K 35.0 |
| polyester resin | — | — | — |
| acrylic resin | — | — | — |
| melamine resin U20SE |  | 15.0 | 15.0 |
| melamine resin C-303 | 15.0 |  |  |
| xylene | 8.0 | 8.0 | 8.0 |
| Solvesso 100 | 4.0 | 4.0 | 4.0 |
| n-butanol | 7.0 | 7.0 | 7.0 |
| Titanium CR-95 | 45.0 | 45.0 | 45.0 |
| Fastgen blue NK | 2.3 | 2.3 | 2.3 |
| Silicone KF-69 | 0.015 | 0.015 | 0.015 |
| triethylamine | — | — | — |
| ext. catalyst PTS | — | — | 0.5 |
| Baking condition °C. × 30' | 100 | 80 | 100 |
| Film properties |  |  |  |
| pencil hardness Note 2 | HB-F | F-H | 2H |
| gel fraction Note 3 | 84 | 88 | 95 |
| surface cond. Note 4 |  |  | Δ |
| water resist. Note 5 |  |  |  |
| Paint Properties |  |  |  |
| storage stab. Note 6 (50° C.) |  |  |  |
| time color stability Note 7 |  |  | X |

Note 1: resinous weight is expressed by solid weight

What is claimed is:

1. A resinous composition for coating use having a resinous acid value based on the carboxyl groups of a polycarboxylic acid whose tritation midpoint potential in non-aqueous potentiometric titration is more than −300 mV in a state capable of developing a resinous acid value of 2 to 50, obtained by the reaction of (A) a basic resin having as essential functional groups both carboxyl groups derived from polycarboxylic acid whose titration midpoint potential in non-aqueous potentiometric titration is more than −300 mV in a state capable of developing a resinous acid value, and groups reactive with a crosslinking agent and (B) an alkyleneimine compound having at least one alkyleneimine ring of 2 to 3 carbon atoms, in an amount equivalent to a resinous acid value of 0.01 to 50.

2. The composition according to claim 1 wherein the basic resin is selected from the group consisting of acrylic resin, alkyd resin, polyester resin, epoxy resin, polyurethane resin, polyamide resin and polycarbonate resin.

3. A coating composition being excellent in storage stability, time color stability and low temperature curing properties, comprising (C) a resinous composition having a resinous acid value based on carboxyl groups of a polycarboxylic acid whose titration midpoint potential in non-aqueous potentiometric titration is more than −300 mV in a state capable of developing a resinous acid value of 2 to 50, obtained by the reaction of (A) a basic resin having as essential functional groups both carboxyl groups derived from a polycarboxylic acid whose titration midpoint potential in non-aqueous potentiometric titration is more than −300 mV in a state capable of developing a resinous acid value and groups reactive with a crosslinking agent, and (B) an alkyleneimine compound having at least one alkyleneimine ring of 2 to 3 carbon atoms, in an amount equivalent to a resinous acid value of 0.01 to 50, and (D) a crosslinking agent, the solid weight ratio of (C) to (D) being 95–45 to 5–55.

4. The coating composition according to claim 3 wherein the basic resin is selected from the group consisting of acrylic resin, alkyd resin, polyester resin, epoxy resin, polyurethane resin, polyamide resin and polycarbonate resin.

5. The coating composition according to claim 3 wherein the crosslinking agent is an aminoplast.

6. The coating composition according to claim 4 wherein the crosslinking agent is an aminoplast.

* * * * *